INVENTOR.
GODEFRIDUS J. MANDERS
ANTONIUS H.V. VAN LIJF
BY
Frank R Jafari
AGENT

METHOD OF MANUFACTURE OF SUPPORTS FOR MAGNETIC HEADS

Filed Dec. 31, 1964 2 Sheets-Sheet 2

INVENTOR.
GODEFRIDUS J. MANDERS
ANTONIUS H.V. VAN LIJF
BY
Frank R. Jifano
AGENT

United States Patent Office 3,330,033

Patented July 11, 1967

3,330,033

METHOD OF MANUFACTURE OF SUPPORTS FOR MAGNETIC HEADS

Godefridus Johannes Manders and Antonius Hubertus Victor van Lijf, Emmasingel, Eindhoven, Netherlands, assignors to North American Philips Company, Inc., New York, N.Y., a corporation of Delaware Filed Dec. 31, 1964, Ser. No. 422,829
Claims priority, application Netherlands, Dec. 31, 1963, 302,797
13 Claims. (Cl. 29—603)

This invention pertains to supports for magnetic heads and especially to such supports which are adapted to rotate in operation. It relates in particular to such supports which are cylindrical in shape and include, along the periphery thereof, a plurality of magnetic heads adapted to magnetically coact with a suitable magnetic record carrier. Rotating supports such as these are especially useful in the recording and reproduction of video signals.

When using such supports in apparatus for recording and reproducing video signals, it is essential that the various heads be uniformly arranged at the periphery of the support with the gaps thereof at accurately predetermined angles with respect to each other. The gaps are also arranged parallel to each other and to the axis of rotation of the support.

In order to point out most effectively the distinctive features of the invention and the problems it is meant to obviate, reference will first be made to the prior art as shown in FIGS. 1 to 3 of the accompanying drawing; in particular, FIG. 1 shows, in side elevation, a schematic diagram of a rotating support for magnetic heads and a flexible record carrier. FIG. 2 is a side view of FIG. 1, and FIG. 3 is a plan view of the record carrier. In these figures a cylindrical disk 2 is secured to a shaft 1. The disk carries four magnetic recordings and/or playback heads 3 provided with effective gaps 4. A flexible record carrier 5 coated with a magnetized material and guided by a channel 6 moves in the direction indicated by the arrow A. The disk 2 rotates in the direction indicated by the arrow B.

FIG. 3 is a plan view of the record carrier 5 carrying several recording tracks 7. Since the record carrier 5 moves at right angles to the direction of rotation of the disk 2 the tracks 7 make an acute angle with the lateral edges of the flexible record carrier. In this known arrangement, which is intended for recording and playing back video signals quantitative examples are: the record carrier has a width of 50 mm., the diameter of the disk 2 is also about 50 mm. and the speed of the disk is 24 revolutions per second; thus the recording speed of the tracks 7 is about 37.5 m. per second; and the record carrier moves at a speed of 37.5 cm. per second; and the width of each track is 0.25 mm. and the spacing between the tracks is only 0.125 mm. From these examples, it can be seen that the mechanical construction of the entire apparatus has to meet extremely exacting requirements. The value of the angles between the effective gaps is particularly critical. In the prior art apparatus this angle is 90°. A practical requirement is that it must be possible for a recording recorded by means of a particular apparatus to be played back by means of another similar apparatus. If this is to be possible a simple calculation shows that the angle $\alpha$ between two adjacent gaps must have an extreme value of $90° \pm 2$ angular seconds, and this requirement can only be satisfied by means of complicated and hence expensive adjusting mechanisms. In addition, the true value of this angle cannot readily be measured and checking the adjustment is a complicated and involved operation.

A primary object of the invention is to provide a rotating support for magnetic heads in which the effective gaps of the heads are accurately and uniformly distributed around the periphery of the support and adjustments during or after operation are rendered unnecessary.

Another object of the invention is to provide a method of manufacturing a rotating support for magnetic heads in which the effective gaps of the heads are accurately and uniformly distributed around the periphery thereof during the manufacturing of the support.

Another object of the invention is to provide a method of manufacturing rotating supports for magnetic heads in which precision of construction is attained with relatively simple apparatus and which obviates the need for supervision or adjustment during operation.

According to a particular aspect of the invention, the accurate and uniform distribution of the effective gaps around the periphery of the cylindrical support is obtained during the process of manufacture and the necessity of adjustment of the heads during operation is obviated.

Briefly, in accordance with the invention, a plurality of circular flat disks having substantially equal diameters and made of sintered oxidic ferromagnetic oxide material are stably arranged with abutting rims, the centers of at least one group of disks lying on a circle whose center lies in the axis of rotation of the support. Then, a nonmagnetic bonding agent which has substantially the same machinability and resistance to wear as the ferromagnetic material is placed between the disks to bond them together. A suitable bonding agent may be a fusible material such as glass or enamel. Subsequent to the bonding, the diameter of the resulting composite bonded assembly is reduced to a value such that at least those lines of contact between each two adjacent disks which extend parallel to the axis of rotation were removed. The machining operation is continued until the gaps (filled with the bonding agent) between the disks have the desired length.

Thus, the bonding becomes the support and the filling material of the gaps while the portions of the disks not removed by machining become portions of the magnetic heads.

According to an embodiment of the method in accordance with the invention the disks are made from an accurately machined circular rod the diameter of which is constant within narrow limits throughout its entire length. One of the advantages of the method in accordance with the invention is that the absolute value of the diameter of the disks is of comparatively less importance than the relative discrepancies in diameter. Consequently, a rod may be made the diameter of which deviates from the desired value by, for example, from 2 to 4 microns, provided that this deviation is the same within, say, 0.5 micron throughout the entire length of the rod, and this greatly simplifies the manufacture of the disks.

According to another embodiment of the method in accordance with the invention the lateral faces of one or more disks may be provided, at least partly, with a facet in a manner such that the gap-bounding surface has a smaller width than the remaining thickness of the disk. Thus a gap between two disks is obtained of which at least one of the gap-bounding surfaces in known manner has a smaller width than the other gap-bounding surface so that magnetic lines of force are more intensely concentrated and inter alia the likelihood of cross-talk is reduced.

In an embodiment of the method in accordance with the invention the support is built up from three disks preferably having the same thickness. In this case the angles between the gaps are exactly 120°. Compared with the known construction comprising 4 heads, with the same speed of rotation the record carrying tape has to travel at a lower speed, however, this does not provide difficulty in practice. If the diameter of the ultimately obtained support is not to be excessively small, the disks must in this embodiment have a comparatively large diameter for the standard tape having a width of 50 mm. to be completely utilized for recording.

Without sacrificing an excessive amount of material the desired diameter is more simply obtained if, in another embodiment of the method in accordance with the invention, the support is built up from seven disks one of which is arranged concentrically about the axis of rotation. In this embodiment the angle between the gaps is 60° and with the same speed of the support the tape has to travel at a greater speed than in a support having four gaps, however, this also does not provide a difficulty. If the same tape speed is retained, the support has to rotate at a lower speed.

In a further embodiment of the method in accordance with the invention, in which also seven disks are used, all the gap-bounding disks are given the same thickness while the centre disk disposed concentrically about the axis of rotation is given a larger thickness such that after bonding of the assembly this disk protrudes from at least one surface of the support. The protruding surface of the centre disk is completely centred relative to the other disks and hence is a highly suitable reference surface for subsequent operations; consequently the support may be clamped by this reference surface in subsequent operations. If desired, this surface may even serve as a journal for the finished support which may be mounted for rotation in bearings on one side or both sides of the support.

In a still further embodiment of the method in accordance with the invention, in order to increase the efficiency of the various heads formed in the finished support it is of advantage for the centre disk arranged concentrically about the axis of rotation to be provided at its periphery with six grooves evenly distributed around this periphery, this grooved disk being disposed relative to the other disks that the lines joining the centre of each disk and the centre of the support pass through the grooves.

In an embodiment of the method in accordance with the invention the said grooves can be simply obtained by providing the rod from which the disks are made with these grooves, at least partly, before subdividing it into disks.

In another embodiment of the method in accordance with the invention the grooves are made in the central disk by ultrasonic agency after bonding of the disks. This provides the advantage that the accuracy of the positioning of the outer disks is not jeopardized.

The efficiency of the final heads may be further improved if, in another embodiment of the method in accordance with the invention, after the bonding operation the disk arranged concentrically about the axis of rotation, is provided with a central aperture the diameter of which exceeds the diameter of the circle tangent to the bottoms of the grooves.

The method in accordance with the invention is particularly suitable for the known use of glass or enamel as a gap-filling material and as material for bonding the disks to one another, and in still another embodiment this glass or enamel, preferably in the form of a powder, is arranged between the disks after the disks have been joined, the assembly being subsequently heated to a temperature higher than the melting temperature of the glass or enamel so that the molten glass or enamel is drawn between the disks by capillarity.

The invention also relates to a support of the aforementioned kind, manufactured by the method of one or more of the embodiments described.

In order that the invention may readily be carried into effect, two embodiments thereof will now be described, by way of example, with refernce to FIGURES 4 to 16 of the accompanying drawings, in which.

Figures 1, 2:
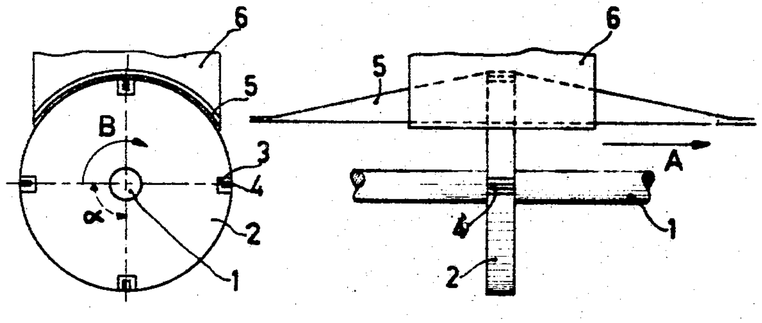
FIGS. 1 to 3 show a known embodiment for use in apparatus for recording and playing back video signals.
Figure 3:
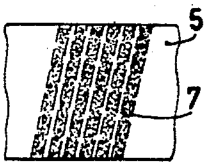
Figure 4:
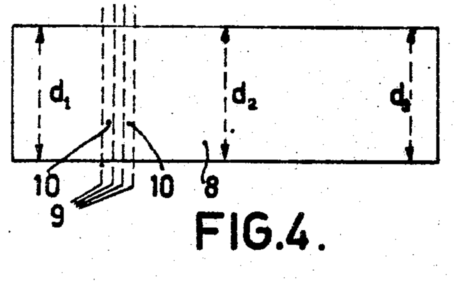
FIG. 4 shows a rod of circular cross-section consisting of sintered oxidic ferromagnetic material.
Figure 5:
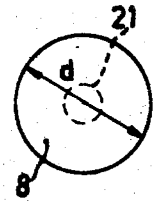
FIG. 5 is a side elevation of this rod.

FIG. 4 shows a rod 8 of circular cross-section for use as starting material for the disks. This rod is made of sintered oxidic ferromagnetic material, for example, ferroxcube. The diameter $d$ (FIG. 5) may be 25 mm. and has a comparatively large tolerance of, for example, 3 microns. The diameters $d_1$, $d_2$ and $d_3$, however, must be identical, with the highest degree of accuracy possible, for example, within 1 micron, and any deviation from the required shape must also be remain within this tolerance. This may be achieved in a comparatively simple manner by grinding and subsequent lapping.

From such a rod disks 10 are made by cutting along the broken lines 9. Thus, the disks 10 have the same diameter within 1 micron.

Figure 6:
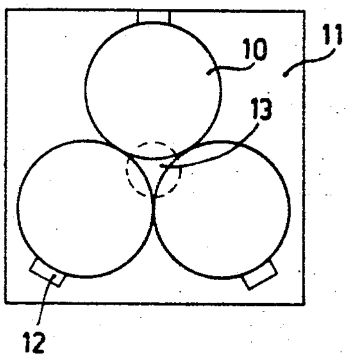
FIG. 6 shows a stable stacking of three disks.
Figure 7:
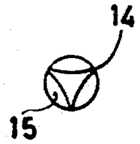
FIG. 7 shows the construction of FIG. 6, the excess material having been removed after bonding of the disks to one another.
Figure 8:
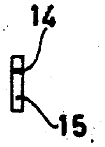
FIG. 8 is a side elevation of FIG. 7.

FIG. 6 shows how the disks 10 are jointed to obtain a support having three gaps. The three disks 10 are arranged on a supporting surface 11 and urged to one another by clamps 12. Since these three disks 10 are stably stacked, a small pressure suffices to hold them in position. Subsequently powdered glass or enamel is arranged in the space 13 between the disk 10 and the assembly is heated to a temperature higher than the melting temperature of the binding agent. By capillarity the molten glass or enamel is drawn into the closest possible proximity to the lines of contacts between each two disks. The assembly is then cooled so that a support is obtained which is composed of three disks 10 firmly bonded to one another. The support is ground until its diameter has a value at which the lines of contact between each two disks 10 lie on this circumference. If grinding is continued so that a support 15 is obtained, gaps 14 are produced between each two disks 10 as is shown in FIGS. 7 and 8, and these gaps may be given any value in a range between less than 1 micron to more than 10 microns, depending upon the greater or smaller amount of material removed. The angle between two gaps is exactly 120°, at least if the diameters of the three disks 10 are equal to one another within narrow limits.

It will be appreciated that if the final support is to have a diameter of, for example, 50 mm. and gaps of 1 micron, the diameter of the disks 10 must be comparatively large. A simple computation shows that in this event the disks 10 must have a diameter of about 87 mm. and the manufacture of a rod of this diameter in which all the diameters must be equal to one another within 1 micron, while possible, is more difficult than the manufacture of a rod having a smaller diameter.

Figure 9:
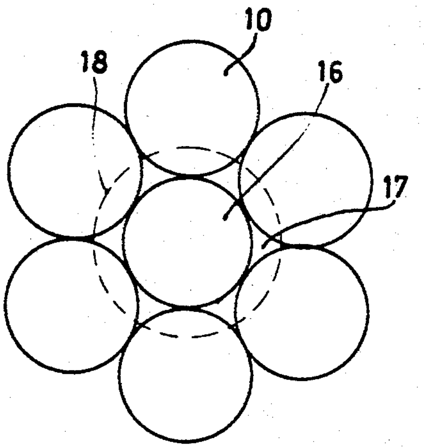
FIG. 9 shows a stable stacking of seven disks.
Figure 10:
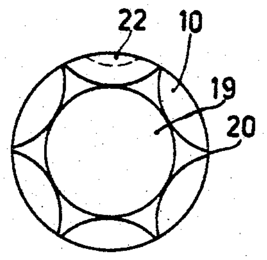
FIG. 10 shows the construction of FIG. 9, the excess material having been removed after bonding of the disks to one another.
Figure 11:
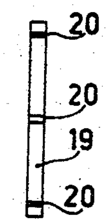
FIG. 11 is a side elevation of FIG. 10.

FIGS. 9, 10, and 11 show a support built up from seven disks 10. Of these seven disks one disk 16 is arranged concentrically about the axis of rotation of the support, the remaining six disks being arranged in stable stacking around said disk 16. The method of manufacturing a compact support from these stacked disks is the same as that described hereinbefore with respect to the support composed of three disks. In interstices 17 glass or enamel, which may be powdered, is arranged, the whole is heated to a temperature higher than the melting temperature of the glass or enamel, and subsequent cooling results in a united assembly from which after grinding down of the periphery of the broken line 18 a support 19 (FIGS. 10 and 11) is obtained having 6 gaps 20, which, provided that disks 10 are used having, as exactly as possible, equal diameters, are at angles of exactly 60° to one another with deviations of certainly less than 2″. A computation similar to that mentioned in the preceding paragraph in this case results, for a diameter of the support 19 of 50 mm., in a disk diameter of about 29 mm. A rod 8 having this diameter may be manufactured with comparative ease within the required tolerances. As is shown by broken lines in FIG. 5, the rod 8 may be provided with an aperture 21 arranged exactly concentrically about the axis, in which aperture a shaft may be secured in the finished support. If this aperture should have to be so large that, as is shown by a broken line in FIG. 10 with respect to one of the segments, after grinding down recesses 22 would be produced at the periphery, these apertures 21 may also be filled with a readily machinable and wear resistant material, such as glass or enamel, before the stack is ground to the required size.

Figure 12:
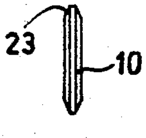
FIG. 12 is a side elevation of a disk having a faceted rim.
Figure 13:
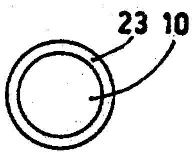
FIG. 13 is a front elevation of FIG. 12.

Alternatively, the disks 10 may be provided, either when being cut from the rod 8 or subsequently, with at least one faceted rim 23, as is shown in FIGS. 12 and 13. As a result the gap bounding surfaces are smaller than the thickness of the body of the disk, ensuring a higher degree of concentration of the magnetic lines of forces and a resultant reduction of the likelihood of cross-talk.

Figure 14:
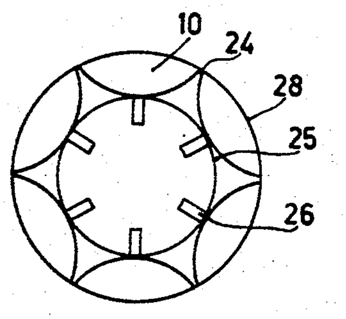
FIG. 14 shows, to an enlarged scale, a front elevation of a support in which the centre disk is provided with grooves.
Figure 15:
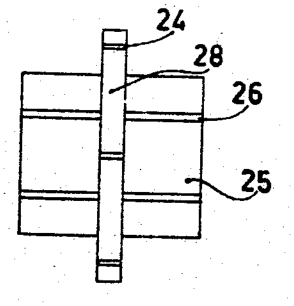
FIG. 15 is a side elevation of the support of FIG. 14.

FIGS. 14 and 15 show, to a slightly enlarged scale, a support 23 made of disks 10 and provided with six gaps 24. A central disk 25 has a thickness greatly exceeding the thickness of the remaining disks and consequently projects from the support on both sides. This central disk 25 is made from a rod provided with six grooves 26 evenly distributed around the circumference of the rod so that the risk of a short circuit between two adjacent circuit components is greatly reduced or even eliminated and hence the efficiency of the ultimately obtained head components is increased.

Each such groove must lie on the line which joins the centre of an outer disk to the centre of the central disk.

Making the central disk 25 thicker than the remaining disks so that this disk projects from the body of the support on one or both sides provides another important advantage. In this manner a reference surface is obtained by which the unfinished support may be clamped. Since the central disk is exactly central with respect to the remaining disks, there are no gripping difficulties in this respect so that, in the processes of grinding and lapping the circumference of the support, the resulting circular surface is absolutely central to the central disk. In addition, this bilaterally projecting central disk may be used as a shaft to be journalled in bearings, a simple, preferably flexible, coupling being used for coupling the support to the driving means.

It is not necessary for the rod from which the central disk 25 is manufactured to be provided with grooves 26. These grooves may alternatively be made after the various components of the support have been united, for example by ultrasonic agency or by spark erosion. In this case the grooves 26 may be provided only in that part of the disk 25 which is engaged by the disks 10. This further improves the suitability of the portions of the disk 25 projecting beyond the support on both sides for journalling purposes.

Figure 16:
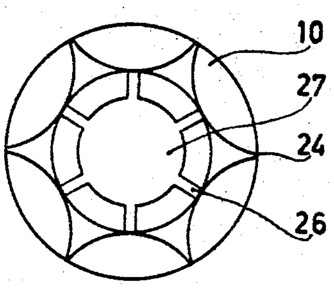
FIG. 16 shows the support of FIG. 14 after the central disk has been bored.

In another embodiment shown in FIG. 16 the central disk 25 may be provided with grooves 26 after the whole has been assembled to form an integral unit, for example, by ultrasonic agency or by spark erosion, the central disk being subsequently provided with an aperture 27 for receiving a shaft to which the support can be keyed. If the central disk 25 projects from the body of the support on at least one side, this again enables the support to be satisfactorily gripped, ensuring the aperture 27 to become located completely centrally. In this case, this bore 27 is preferably made so large that the lower boundary surfaces of the grooves 26 are removed, which results in an improved separation of the circuits.

Obviously, in the embodiments of the method in accordance with the invention described hereinbefore only supports which include circuit components having effective gaps for magnetic recording and/or play-back heads are obtained which must be completed to form complete circuits. This may be effected, for example, in a manner not shown by mounting on the same shaft a second support which carries U-shaped circuit components equal in number to the gaps, the upper end faces of the limbs of each U being arranged one on each side of an effective gap, a coil being wound on the piece connecting the limbs. The flat ground side of the support and the likewise flat ground end faces of the U-shaped circuit components in this case engage one another, as the case may be, under pressure, without the interposition of an adhesive. Current may be supplied to the coils or taken from them in known manner, for example, by slippings and brushes.

By carrying out the embodiment described of the method in accordance with the invention a cylindrical support is obtained which is provided along its circumference with a plurality of circuit components for magnetic recording and/or play-back heads which each comprise an effective gap, in which support the angles between the various gaps automatically are substantially exactly equal to one another so that they require no complicated and expensive adjusting mechanisms. In addition, manufacture of said supports is comparatively simple and may be effected in large quantities so that the resulting supports may be much cheaper than the supports obtained by known methods.

What we claim is:

1. A method of manufacturing a cylindrical support adapted to rotate in operation and provided at its periphery with a plurality of magnetic heads each having an effective gap, comprising: arranging a plurality of circular flat disks composed of sintered oxidic ferromagnetic material and having substantially the same diameters in a manner such that the rims of adjacent disks abut each other, the centers of one group of said plurality of disks lying in a circle whose center lies in the axis of rotation of the support, placing a nonmagnetic bonding agent between the disks, thus forming a composite bonded assembly, said bonding agent having substantially the same machinability and resistance to wear as said ferromagnetic material, and machining said composite assembly to reduce the diameter thereof to a value such that at least the lines of contact between each two adjacent disks which extend parallel to the axis of rotation are removed, said machining being continued until the gaps filled with the bonding agent and having a predetermined length are produced between adjacent disks of said one group.

2. A method as claimed in claim 1, wherein said one group comprises three disks arranged with abutting rims.

3. A method as claimed in claim 1, wherein said one group consists of six disks arranged with abutting rims and said plurality includes one disk arranged within said circle and whose rim abuts the rims of the disks of said one group.

4. A method as claimed in claim 1, in which glass is used as the material for filling the gaps, characterized in that this glass, preferably in the form of a powder, is arranged between the disks after the disks have been brought into engagement with one another, after which the whole is heated to a temperature higher than the melting temperature of the glass so that the molten glass is drawn between the disks by capillarity.

5. A method of manufacturing a cylindrical support adapted to rotate in operation and provided at its periphery with a plurality of magnetic heads each having an effective gap, comprising: cutting a plurality of circular flat disks from an accurately machined rod of circular cross section composed of sintered oxidic feromagnetic material whose diameter is substantially the same through a substantial portion of its length, arranging a plurality of said disks having substantially the same diameters in a manner such that the rims of adjacent disks abut each other, the centers of one group of said plurality of disks lying in a circle whose center lies in the axis of rotation of the support, placing a nonmagnetic bonding agent between the disks, thus forming a composite bonded assembly, said bonding agent having substantially the same machinability and resistance to wear as said ferromagnetic material, and machining said composite assembly to reduce the diameter thereof to a value such that at least the lines of contact between each two adjacent disks which extend parallel to the axis of rotation are removed, said machining being continued until gaps filled with the bonding agent and having a predetermined length are produced between adjacent disks of said one group.

6. A method as claimed in claim 5, wherein said one group comprises three disks arranged with abutting rims.

7. A method as claimed in claim 5, wherein said one group consists of six disks arranged with abutting rims and said plurality includes one disk arranged within said group and whose rim abuts the rims of all the disks of said one group.

8. A method as claimed in claim 7, characterized in that all the gap-bounding disks are given the same thickness while the central disk arranged concentrically about the axis of rotation is given a much greater thickness than the other disks, in a manner such that after bonding of the whole the said central disk projects from the body proper of the support on at least one side.

9. A method as claimed in claim 7, characterized in that the central disk arranged concentrically about the axis of rotation is provided at its periphery with six grooves evenly distributed around the periphery, this grooved disk being so located relative to the other disks that the line joining the centre of each disk to the centre of the support passes through a groove.

10. A method as claimed in claim 9, characterized in that the rod from which the disks are made is previously provided, at least partly, with the grooves.

11. A method as claimed in claim 9, characterized in that the grooves are made in the central disk by ultrasonic means after the bonding together of all the disks.

12. A method as claimed in claim 9, characterized in that the disk arranged concentrically about the axis of rotation is provided with a concentric aperture after the whole has been bonded, the diameter of this aperture being greater than that of the circle tangent to the bottom of the grooves.

13. A method of manufacturing a cylindrical support adapted to rotate in operation and provided at its periphery with a plurality of magnetic heads each having an effective gap, comprising: machining facets in the rims of a plurality of circular flat disks composed of sintered oxidic ferromagnetic material and having substantially the same diameters, arranging said plurality of disks in a manner such that the rims of adjacent disks abut each other, the centers of said disks lying in a circle whose center lies in the axis of rotation of the support, placing a nonmagnetic bonding agent between the disks, thus forming a composite bonded assembly, said bonding agent having substantially the same machinability and resistance to wear as said ferromagnetic material, and machining said composite assembly to reduce the diameter thereof to a value such that at least the lines of contact each two adjacent disks which extend parallel to the axis of rotation are removed, said machining being continued until gaps filled with the bonding agent and having a predetermined length are produced between adjacent disks, the gap-bounding surface of each disk thereby having a width which is smaller than the disk thickness near its center.

References Cited

UNITED STATES PATENTS

| | | | |
|---|---|---|---|
| 2,352,023 | 6/1944 | Schuller | 179—100.2 |
| 2,938,731 | 5/1960 | Meyer. | |
| 3,037,092 | 5/1962 | Neumann. | |
| 3,229,355 | 1/1966 | Hluszko | 29—155.5 |

FOREIGN PATENTS

| | | |
|---|---|---|
| 366,067 | 1/1963 | Switzerland. |

JOHN F. CAMPBELL, *Primary Examiner.*

JOHN L. CLINE, *Assistant Examiner.*